May 2, 1967 S. A. TALBOT ETAL 3,317,715

CODED CARD

Filed June 7, 1965 3 Sheets-Sheet 1

INVENTORS
Samuel A. Talbot
George N. Webb

BY Walter G. Finch
ATTORNEY

May 2, 1967     S. A. TALBOT ETAL     3,317,715
CODED CARD
Filed June 7, 1965     3 Sheets-Sheet 3
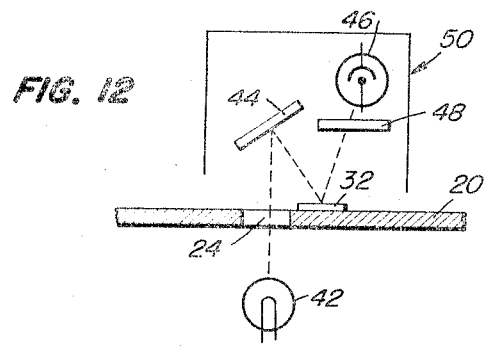
FIG. 12
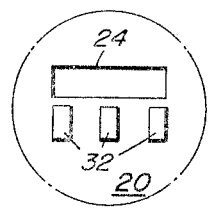
FIG. 13
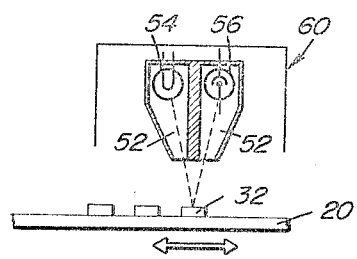
FIG. 13A
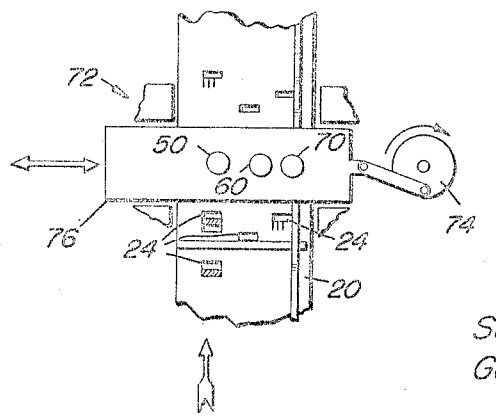
FIG. 14
FIG. 15
INVENTORS
Samuel A. Talbot
George N. Webb
BY Walter G. Finch
ATTORNEY

United States Patent Office 3,317,715
Patented May 2, 1967

3,317,715
CODED CARD
Samuel A. Talbot, Baltimore, Md.; Belle Otto Talbot, executrix of said Samuel A. Talbot, deceased, and George N. Webb, Baltimore, Md., assignors of thirty percent to Walter G. Finch, Baltimore, Md.
Filed June 7, 1965, Ser. No. 467,177
1 Claim. (Cl. 235—61.11)

This patent application is a continuation-in-part of U.S. patent application, Ser. No. 10,198 filed by the applicants on Feb. 23, 1960, for "Coded Card," and now abandoned. This invention relates generally to registers, and more particularly it pertains to data storage media, such as card records for use in automatic sorting and handling of information.

In certain special applications, such as hospital "histories" used for research purposes, the ordinary punched card does not carry nearly enough information. Each column of data contains only a relatively few yes-no bits of characters which under the present practices number from ten to a hundred. The great need, at least, is to encode ten to one hundred times as much information as represented in a hundred three digit figures. Further, it is important to do this on one card especially if a sort or a correlation is being made of tens of thousands of persons.

In addition to the above, data from meteorological, photographic, and bio-satellites is complex and is emitted in great quantity.

Each pass of a satellite must report the data accumulated over the preceding two hours, and often redundantly to several stations in order to minimize error. Each pass of a satellite gives for each station, about ten minutes of recording. This is usually taken on seven channel tape, which run 30 in./sec. Each station, therefore, collects about 1500 ft. of tape every two hours.

In order to cope with this, a six month flight of a satellite would require 18,000 feet of tape per day or 18 reels of tape per day, or 3,240 reels of tape per satellite per station. This presents a major problem in data handling, storage ad retrieval, not to mention processing of the tape. In addition, several satellites may be running at a time, and some of the data will be photographic (information-dense). Even more redundancy than 3 stations seeing each transmitter, may need be introduced, and ultimately processed out.

Clearly this problem resembles that of data storage and processing for patients in a hospital, as regards the variety and mass of data to be handled. To use a tape for more than the initial recording, as at present, makes the data inaccessible, hard to sort, compare, correct and analyse.

The coded card of the present invention makes it possible to use one card for each pass of a satellite, for each channel of information, thus giving 84 cards per day or 1500 cards per station per six months flight of a satellite. This number of cards would occupy about ten inches of card file, thus giving not only a reduction of 100 times in storage space, but also much more flexibility for processing individual categories of data simultaneously.

Accordingly, it is an object of the present invention to provide a coded card and method for storing multiple bits of information in discrete common areas of a file record card, tape or sheet.

Another object of this invention is to provide novel composite code patterns for increased data character storage.

Yet another object of this invention is to provide various readout systems for composite data recordings.

Another object of this invention is to provide storage media for storing data in very large quantities, comparable to the memory capacity of a large computer, on a card, tape or sheet.

Still another object of this invention is to provide a process and means for locating data systematically on a card, tape or sheet so that categories may be readily sorted out according to several independent variables (dimensions or coordinates) superimposed thereon.

And still another object of this invention is to provide a method and means for densely storing data in a small card, tape, or sheet.

Still another object of this invention is to provide mechanical, optical, magnetic and electro-conductive information storage in coincident relationship on register media.

These and other objects and advantages of this invention will become more readily apparent and understood from the accompanying specification and drawings in which.

Figure 1:
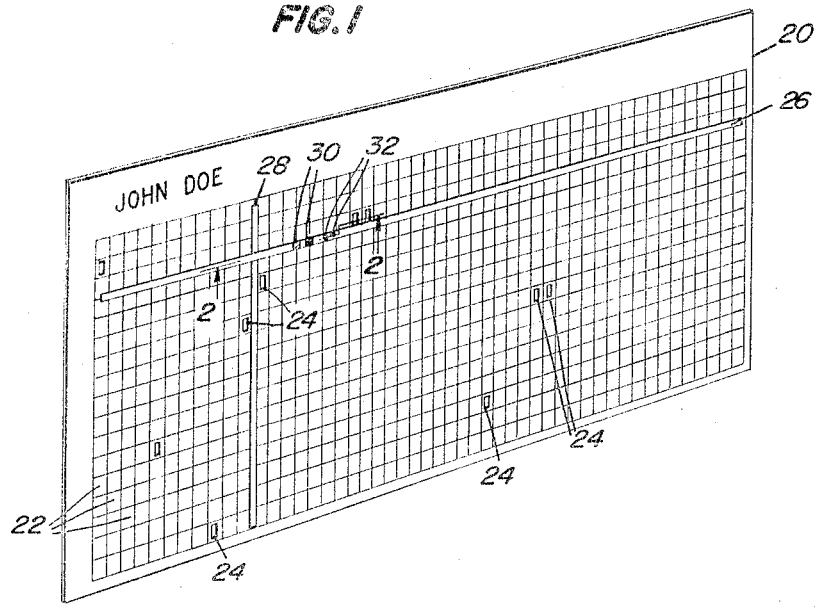
FIG. 1 is a perspective view of a data storage card incorporating features of the invention of recording thereon.

FIGS. 3 to 11, inclusive, are detail plan views of record characters from a card incorporating features of this invention illustrating combinations thereof to increase the information storage content of the card;

FIG. 12 is a schematic diagram illustrating color readout apparatus;

FIG. 13 is a plan view of a portion of the top of the record card of FIG. 13A;

FIG. 13A is a schematic illustrating pickup apparatus for readout of printed bits or patterns;

FIG. 14 is a schematic diagram illustrating magnetic readout apparatus; and

FIG. 15 is a schematic illustrating a transit device for scanning or coincidence readout of data information.

In order to facilitate the understanding of this invention and patent application, certain definitions are listed below.

A card as used hereinafter is a rectangular sheet or tape of any flat material carrying data for computation. An aperture is defined as an area of different transmittance (opacity) than its surroundings. The aperture need not be a hole. It can, for example, be made by photo-etching a coating, or locally darkening a translucent card.

Aspects of information as used in this application are as follows:

(a) Data modality is defined as one of various physical modes of registration, such as:
    (1) magnetization (bitwise or amplitudewise) on oxide or nickel coating;
    (2) optical as photographic image in reflective or transmissive form, printing (black or colored);
    (3) electrical as chargeable capacitance, semiconductive or conductive layer or insert;
    (4) mechanical as holes, notches or embossing; and
    (5) chemical as impregnation or surface deposit of a chemical (e.g., fluorescent, radio-active material, dye or mordant, salt, catalyst, reactant or substrate).

(b) Data type is defined as one of various classes of information, such as:
    (1) digital (binary, trinary, octal, decimal) e.g., holes, dots, dashes, lines/cm.;
    (2) analog as amplitude of magnetization, photographic density (reflectivity, transmissivity);
    (3) alphabetic as letters of any language, symbols and forms as triangles or circles, specially formed characters adapted to machine reading; and (4) numeric as arabic, roman, groups of lines, dots or marks.

(c) Data category is defined as one of various hierarchic groups of information such as:
  (1) factual data;
  (2) instructions (flow, control, operation, programming or processing of factual data); and
  (3) organizational information such as information which tells about locating or classifying factual or instructional data, on the card.

(d) Physical arrangement is defined as one of various spatial orderings of data, such as adjacent, opposite, surrounding, linear, areawise, punched through, overlaid, obverse, or reverse.

Many different processes have been employed for recording data on register media. The storage of data as characters in abscissa and ordinate (or x–y array) on cards is quite common. Characters consisting of holes used mechanically or optically, or printed spots of a single color, and magnetization are already in use. Some attempts have been made to include a third dimension (or a z condition for example) by orientation of magnetic flux polarity in a character.

The various steps in the novel method of providing control of record-controlled apparatus are illustrated in FIG. 1 where a control record 20 is shown in the form of an elongated card. It is seen that several rectangular area units 22 are available for any given size of record 20. Also, generally shown, are a plurality of characters 24 each of which normally are centered within selected "area units" 22. The maximum number of characters 24 which can be accommodated is determined by the number of area units 22 available. If the capacity of a record 20 for characters 24 is increased by reducing the size of the area units 22, a limit is reached according to information theory wherein a noise level precludes further reduction. This may be due to grain size in the media of the record 20 or to a mechanical limiting. The useful limit is reached when one code character 24 is indistinguishable from an adjacent character 24. This applies to any known method of inscription whether punching, embossing, printing, or magnetizing is used to construct the character.

Since, to be distinguishable a character 24 must be surrounded by the base media, it is proposed that this otherwise waste surrounding space be put to use for modifying the signal from given but not necessarily adjacent characters 24, to increase the information contained therein. Further, it is proposed that the character may itself be superimposed by another form of inscription not altering the original function but carrying additional modifying data related thereto.

The base for additional inscription may take the form of a finite width horizontal magnetizable strip 26 defining the horizontal rows of area units 22 or a similar vertical magnetizable strip 28 between the columns of area units 22. The strips 26 or 28 then may be used to store digital or analog (e.g. sound track) information in magnetized areas 30 as shown in FIG. 2.

Alternately, these strips may also be recorded and read optically. Again, printed spots 32 may be located and even superimposed upon the magnetizable strip 26 since there ordinarily would be negligible magnetic masking caused thereby. These spots 32 may be read optically and, if in color, the use of suitable selective reading filters cause them to carry still more information which may be stored as hue, saturation, tint, or shade. The arrangement of spots 32 or magnetic areas 30, when read in sequence can provide a train of pulses or a variable voltage selectively readable by existing electronic means. The control signal obtained from these magnetic spots 32 or areas 30 coincidentally combined with information from selected characters 24 enhance, modify, or obliterate the signals therefrom.

Printed spots 32 may alternatively be deposited in the form of metal or other electrical conductor of any desirable degree of resistivity. Thus energized, selective electrical gates would provide a variety of signals depending upon the amount of electrical current flow through the spot 32.

Figure 2:
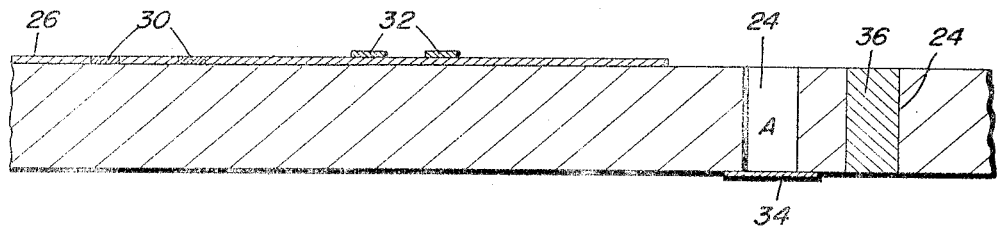
FIG. 2 is a cross-section view along line 2—2 of FIG. 1.
Figure 11:
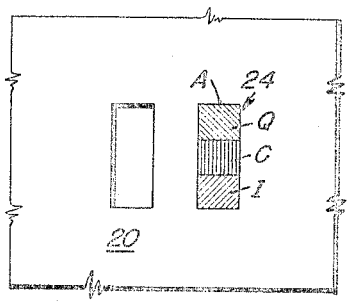

If the character 24 consists of an optical or mechanical aperture A as shown in FIGS. 2 and 11, the signal therefrom may be modified without affecting its original information function by a translucent color filter element 34 having any desired hue, tint, or shade which may take the form of an overlay as depicted, or a filling. If the character 24 is of a type sensed by electrical contact, an electrically resistive filling 36 may be used to modify the amplitude of the step function signal normally produced. It also follows that a magnetic type of character 24 may be overprinted by a color or shade character.

Some of the possible information-containing patterns will now be discussed.

Figure 3:
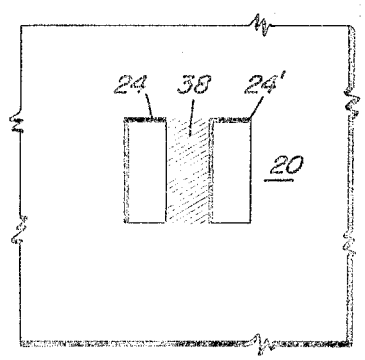
Figure 4:
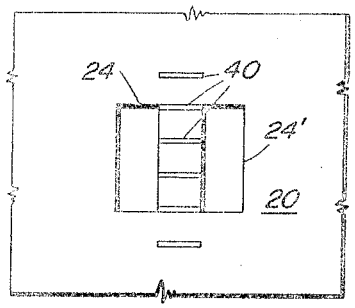
Figure 5:
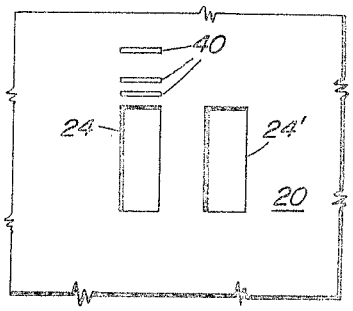
Figure 6:
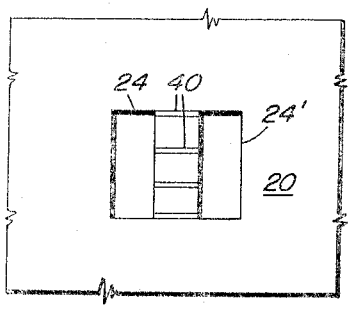
Figure 7:
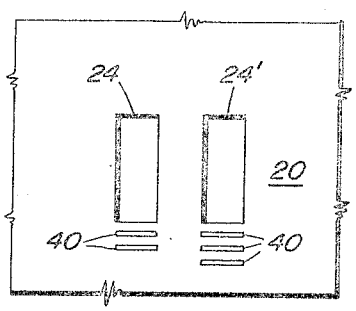

In FIG. 3 there is shown an adjacent pair of characters 24 and 24' which may, for example, be optical apertures. In the waste bordering space of one character 24 either above, below or at the side as shown, there is provided a printed area 38 of grey, black, or hue or tint of color. This printed area 38 is meaningful when sensed in conjunction with one of the characters 24.

The printed area may be subdivided into a coded array of printed lines 40 as shown in FIGS. 4, 5, 6, and 7, in which their location with respect to the chosen character 24 as well as their array code have modifying properties thereto.

Figure 8:
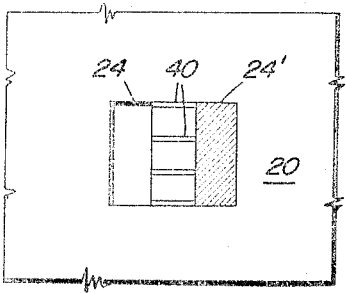
Figure 9:
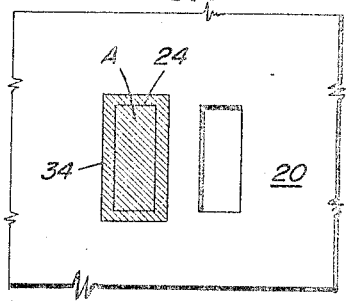
Figure 10:
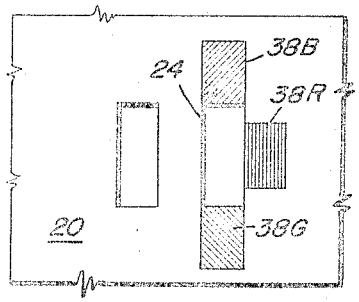

Adjacent pairs of characters 24 and 24' may be used to modify one another as shown in FIGS. 8 and 9, without destroying their original functions. In FIG. 8, if the characters 24 and 24' are of the electrical sensed type, character 24 may be modified or modulated by printed lines 40 for optical or magnetic sensing or both (if superimposed layers are employed). Additional combinational information from character 24 is available also by utilizing the adjacent character 24' in some different characteristic, such as partial conductivity as opposed to the "on" or "off" function of a normal character 24'.

The number of such configurations possible is legion, but some are not practical in combination. For example, an optical aperture type of character, after all, is not an aperture when filled with resistive material. Therefore, a composite use of this type is impossible.

Examples where a modality of data modifies the stored data represented by the aperture are where the juxtaposed spot raises to a power the number represented by the aperture. Also where the juxtaposed spot determines whether the datum represented by an aperture is in binary or binary-decimal code.

A different kind of information possibility arises when interlaced with the x–y array is a second x'–y' array. For example, in the pattern illustrated in FIG. 10, a character 24 of the aperture type is used to sensitize a photocell reader to then read, say, a red printed area 38R to the right. A specific bit of information may also be conveyed by an adjacent black printed area 38B above the character 24 and a green printed area 38G below.

In some cases, a plurality of signals may be extracted from one character 24 alone as shown in FIG. 11. The various shadings attempt to depict a superimposition on the entire aperture A of a greyness or quantity of light Q, a color or hue C, and chromaticity or purity I. Instrumentation, now well known in the art, is available to separate and produce independent signals from a composite arrangement.

A color readout 50 of composite type is shown in FIG. 12. A lamp 42 illuminates the card type control record 20 from the lower side. As the punched hole character 24 is brought into alignment therewith, the illumination passes through to produce a signal in the conventional manner. A portion of the passed-through illumination is diverted by a mirror 44 or other reflective device and caused to impinge upon the printed spot 32. (The transmitted portion is also informationally usable.) The illuminated spot 32 then actuates a photocell 46 to a degree, depending upon the light absorption of the spot 32 and produces a modifying signal as has been related. If the printed spot 32 is in color, a color filter 48 interposed in the light path to photocell 46 allows the "reading" or response of the photocell 46 only to selected wavelength combinations.

In FIG. 12, mirror 44 is semi-reflecting and passes light to an additional photocell (not shown). The result is to obtain two signals.

A coded spot readout 60 is shown in FIGS. 13 and 13A. This readout operates by oscillating the control record 20 as shown by the double-headed arrow in proximity to the tips of a pair of transparent light guides 52. Light guides 52 form a light path from a lamp 54 to the oscillating record 20 and back to a photocell 56. The simple signal conventionally produced by a selected character 24 is further modulated or distinguished by other signals or pulses produced by the moving printed spots 32. The combination of the two signals may be done optically into one photocell 56 or the output from separate photocells may be electrically combined.

A magnetic reading head 70 is illustrated in FIG. 14. Head 70 consists of the conventional gap type core 62 and a winding 64. As shown by the double headed arrow, the control record 20 is made to oscillate parallel to the horizontal or vertical magnetizable strip 26 or 28, respectively. The magnetized areas 30 induce signals into winding 64 as they pass near the gap of core 62. These signals then are combined by well-known means with the conventional signal from a selected character 24 on the same record 20.

The optical and magnetic information may be inscribed on opposite sides of the card at the same location, and read out in combination. There is illustrated generally in FIG. 15 a transit device 72. This device 72 is designed to produce the type of oscillation mentioned in the previous paragraphs. However, for convenience, the motion is imparted to the read-out devices instead of to the control record.

For example, a reciprocating drive 74 is arranged to slidably move a guided cross bar type of a reading plate 76, as shown by the double headed arrow, as the control record 20 is passed beneath in the direction of the feathered arrow. The readouts 50 and 60 and reading head 70 in any desired combination are mounted on this plate 76, preferably in an adjustable plugboard fashion. As the control record 20 moves, characters 24 in selected rows together with their modifying printed lines, spots, or areas are optically, magnetically, or electroconductively read out or scanned in transverse columnar fashion by the motion of the reading plate 76.

It is to be noted that an IBM card (with 80 positions) can be prepared having 80 spots which are optically transparent on a card, which is otherwise opaque. The data is impressed by printing a screen of controlled density (half tone), which may be different for each spot.

The "card" (tape or sheet) may be completely covered with magnetizable material, to facilitate combined use of punching, optical and magnetic modalities in recording (a novel combination). Also, a photographic coating may be superimposed or may be placed on opposite side of the card.

Data handling with multidimensional cards of the present invention can be used to help solve the problem of readout. One of the major problems in connection with data processing is readout of a large amount of coded information from a small area. The main principle of the present invention is to increase the information density by putting additional information into the form of other modalities, so that areas adjacent to holes or slots as well as the holes themselves, may carry added information of several kinds, bitwise or graded.

Obviously, the "readouts" of superimposed (or very close) information, must be sequential. Consequently, each spot (e.g., hole) not only reads out (e.g., on the active memory of the computer); but after this readout, sorts the "card" into the next reading device at that spot. This then picks up additional information (e.g., magnetic) and resorts the card into a third readout system which picks up still other (e.g., optical) information.

These successively sorting readouts may be going on simultaneously for different cards at various sequential stages of readout; so that total reading time of a pack of "multidimensional cards" is a little longer than for the usual bidimensional card. Alternatively, each card may be processed sequentially without sorting (e.g. mechanical, optical, magnetic, conductive), evenly distributing and building up its information into the "words" of the machine memory.

The printout of a multidimensional "card" from a memory, similarly may be in a sorting or a predetermined order. Thus, the "memory" would first actuate a punch recording, next advance the card to a magnetic recorder, and finally to an optical recorder (e.g. color printing wheels) before finally "exhausting" its "memorized" data.

"Decoding" of a card would be executed by the computer also, by transferring the card contents to a computer memory, and translating by the appropriate decoding "program" and with an automatic typewriter.

Certain medical data (such as heart sounds, vector ECG) is of high information density bitwise but low density clinically. The redundancy is essential, as it embodies relationships which cannot be expressed in bits. The computer may be programmed at any one time to take off only on selected aspects of the analog information (e.g. mean amplitude of systolic murmur) recorded on the "card."

A second program may scan a pack or cards for "gallop" in heart sounds. A third program may scan for some aspects of the record not previously recognized. Since information in a record (like entropy) has no practically definable "zero," it is better to store the record itself than its (sometimes unknown) "analytic components." So for proper storage of medical data, both analog and digital modes are essential.

Scanning a card for analog data or aspects thereof, uses techniques well-known to the art. Some clinical studies may require reading and processing the stored analog data; other studies will not.

The computer designed to properly serve medical science, will have analog-to-digital (and inverse) equipment built in. When analog information is used, it should be processable by either digital or analog computing sections of the equipment. A small amount of analog information, converted to digital, can easily choke the very large digital computer memory. Thus, 3000 c./s. modulated to one percent accuracy, contributes $10^6$ bits per 6 inches of analog record (6 heartbeats) seen on a single channel.

The multidimensional card for medical information must also provide areas of digital information, if one card is to describe a patient. This is an importannt desiratum, for public health work.

The "punches" mentioned need not be confined to the "body" of the card, since combination of edge punches (slotting) with bodypunches (holes) can also be used; also, of either type of holes or both with colors, magnetization, and the like. For many pre-sorting and sorting purposes, the edge punch is quicker and simpler than the body hole. They should often be used in combination, for medical records.

As previously pointed out, data from meteorological, photographic, and bio-satellites is complex and emitted in great quantity. Each pass of the satellite must report the data accumulated over the preceding two hours, and often redundantly to several stations in order to minimize error.

Each pass of the satellite gives for each station about ten minutes of recording, with the overall result that a six-month flight of a satellite requires a large number of reels of tape as previously described. This presents a major problem in data handling, storage and retrieval, not to mention processing of the data. In addition, several satellites may be running at a time, and some of the data will be photographic (information-dense). Even more redundancy than three stations seeing each transmitter, may need to be introduced, and ultimately processed out.

Clearly, this problem resembles that of data storage and processing for patients in a hospital, as regards the variety and mass of data to be handled. To use tape for more than the initial recording, as at present, makes the data inaccessible, hard to sort, compare, correct and analyze. Thus, as previously pointed out, using one card for each pass, for each channel of information, would give 84 cards/day or 1500 cards/station/6 month flight. This makes about 10″ of card file; which gives not only a reduction of 100 times in storage space, but also much more flexibility for processing individual categories of data simultaneously.

It remains to show that all the data on one channel of 1500 ft. of tape (at 30 in./sec., 100 bits/inch=$4.5 \times 10^6$ bits) can be stored on and retrieved from a single "3 x 8" card, using the technique and records of the present invention as previously described. An example of how this may be done is discussed here.

The method of storing data in very large quantity, comparable to the memory capacity of a large computer, on a "3 x 8" card record 20 as described is accomplished by the previously mentioned fine-grained magnetic or optical registry, in binary as well as in analog form (the latter being intrinsically more efficient).

This invention makes it possible to locate data systematically, so that categories may be readily sorted out according to several independent variables (dimensions or coordinates) superimposed. These are, besides the usual $xy$ arrangement of holes, color, magnetization, print (black-white), in conjunction with each other.

In addition, the technique and provision of multidimentional classification and search on cards as indicated makes feasible the use of very densely stored data on a small card, tape or sheet.

The data storage-retrieval system for use with the card may take the several special forms as previously described and as summarized below.

Magnetic storage is used generally for short term applications, such as analysis of data from satellites having high data output (e.g. meterological, photographic, biological). In its simplest form, magnetic storage utilizes the standard hole-sort system for search and classification. On a "3 x 8" card record 20 the space between the columns of holes can store about 2000 ten bit binary words (in magnetic form), while the space between the rows can store some 24,000 more bits in binary form or about 120,000 bits in analog form. Black and color-imprinting are used to extend the classification beyond that given by the holes, to cope with the increased information stored.

Optical storage is used for permanent record applications, or cases where successive copies will be needed for various analyses from time to time. Important examples are the storage of public health case histories for a city of $10^6$ people, or the use of many generations of case histories by teaching hospitals, for medical and genetic research. The data capacity on a case history may approach $10^6$ bits, 1000 times that of a current punch card. Tape or punch card is entirely too cumbersome, bulky, and inaccessible for storage and retrieval in such application.

Medical data also involves much information in analog form (EKG, EEG, ECG, sound etc.) which is readily recorded on an optical card. The finer graining of precision registry on a card by optical methods, increases the storage capacity by a factor of about 20 over magnetic registry.

In this application, where data space is at a premium, holes are wasteful. Thus, sorting of the data would be done by chromatic means, superimposed on the photographic. Potentially, a "3 x 7" optical area can store about $4 \times 10^5$ retrievable bits of information in binary form, or more if analog data is included. This capacity may be compared with 8000 thirty-two bit words ($2.5 \times 10^5$ bits) in a 704 core-memory. A somewhat larger "8 x 10" card might be better for medical or satellite records, holding about $2 \times 10^6$ bits.

The essential difference between this mode of data storage and that in a computer is speed of access. Sorting is slow, and correlation of data read directly from such cards, would also be relatively slow. However, such a card could also be used in a load-compute-clear sequence on a large computer, consuming but a few seconds of machine time to correlate or process medical data. The search programs would tie in with the multimodal classification system described for ready access without specialized experience in computer programming. With micropositioners, selected portions of a satellite or patient record could be reproduced or collated very rapidly.

The applications just described, do not show the combination of different modes of storing information. In these illustrations, the holes, colors, etc. were not used as part of the basic code to increase the information stored. Instead they illustrate the use of punch, color, etc. on magnetically or optically registered cards, as part of such operations as information organization, retrieval, or programming for processing.

From the theoretical standpoint, the maximum possible information is stored by covering the whole face of the card with the smallest possible elements of the most compact mode. One may then add another mode on the other side, print a third layer on top, etc. The information capacity can then be increased by more than the aggregate of the separate layers, by using two or more layers in conjunction during the coding-decoding process.

Thus, two binary units have four configurations two underneath give four more; with their total (8) becomes sixteen ($=2^4$ vs. $2 \times 2^2$) by using them in combination. So two units in each of three layers used in conjunction, yield $2^6=64$ configurations instead of $3 \times 2^2=12$.

Similarly, a group of six magnetic bits used alone gives sixty-four counts; but combined with a hole gives one hundred twenty-eight choices. Two colors alone give four configurations, but used together with a hole, increases its coding capacity by a factor of four; which is often enough for certain semi-quantitative or small-range variables.

It is only when one need not store maximal information, that the advantages of multimodal storage becomes evident. For instance, it is advantageous to organize the information on a card so that it can be located visually, as well as by computer. The combination of machine and human reading is often advantageous, not only in cost but in speed. The use of visible coding such as holes, color, or print, can shortcut certain searching operations.

In the satellite and medical applications, as previously mentioned, the data are not maximal in number, but are extremely varied in nature. Information comes as "yes-no," "on-off," "normal-abnormal," departure from a fixed or average value by so many arbitrary units (e.g. ++++), vibration frequency from 5 to 15, a sound sample, an electrocardiogram trace, a pressure from 80 to 180, amplitude and angles of a vector continuously varying acceleration and its derivatives.

These distinctions can be organized and displayed visually on the final data card (rather than in a form intelligible only to a computer), when the full information capacity of the card is not actually needed ($10^5$ bits=10 pages of typescript translated into binary form). For this reason, from the viewpoint of the user-scientist (rather than the computer-engineer), the multidimensional coding as previously described would render the data of satellite or medical history directly accessible, which is untrue if recorded entirely in binary or numerical form in a single mode.

Several different systems can be devised for utilizing the teachings of this invention as discussed below.

The first of such systems is a machine information system for intramural hospital use as indicated below:

(1) A master history card is established for each patient containing his whole history or references to other cards carrying portions thereof. This master card may be in form of a photographic negative:
  (a) For producing a duplicate (positive) "working file" for sorting operations as used in research, diagnosis, or follow-up;
  (b) For automatically issuing selected (positive) portions as required by particular physicians or for larger files (city, regional) as may be authorized; and
  (c) For producing "research cards" reorganized to carry both patient and operational information in various modalities, for the purpose of automatic computation, as auto-and cross correlation, frequency analysis, averaging, variance analysis, vector analysis, differential diagnosis, factor analysis, cluster analysis, and other analytic and synthetic procedures as may be developed;
(2) A master file (hospital memory) and a "working file";
(3) A reproducing machine for selectively abstracting desired portions of the "working card" and for translating same from digital, analog, or other types of data into English, as required;
(4) A transmitting machine for teletyping same to staff physicians in the hospital or their offices; and
(5) A research cardmaker, for combining operational or instructional data or organization on one card with selected history information. This in intended to include transposition of optical into magnetic, printed, mechanical, or other forms for rapid data processing.

The second of these systems would be a machine medical information system for city or regional use, such as:

(1) A system for conveying written authorization and responsibility from physicians in various medical examining centers of industry, public administration or private practice to local hospital files of patient data for abstraction of specific data needed.
(2) A machine for teletyping in code much confidential information, and its decoded presentation in impermanent (self-destroying) form, with proper safeguards, to the local physician for diagnostic or selective purposes.
(3) A machine for assembling analytic programs of patient data in local hospitals for medical research in the region and which would utilize an associated library of data-processing sub-programs, to be synthesized for the particular problem at hand; and
(4) A large computer for city-wide or regional use, adapted to use the patient research data card above described as supplementary "micro-memory."

The third system would be a machine information system for satellite data-handling, such as:

(1) Transducers, data reduction aloft and telemetering on frequency channels, on one transmitter band, to be at disposal of satellite scientists and engineers;
(2) Terrestrial tape to be transferred to a set of "cards" channel by channel, with the cards being distributed to the project scientists working on separate aspects of the problem and with the cards each containing $\frac{1}{15}$ of the data per orbit and of the order of $10^6$ bits ($10^3$ c./s. $\times 10^3$ sec.) of fairly homogeneous information;
(3) This data now has to be reduced as to redundancy and as to error between telemetering stations. This is best done in optical form, by "transmissive" cards bearing multimodal information;
(4) The reduced data now is converted into magnetic form for correlation, frequency analysis, graphs, and other operational transforms. Organization of operations (instructions) and the operations themselves programs) are preprinted on cards to which the satellite data are then transferred; and
(5) The cards act as memories for computers and are rapidly loaded thereinto by simultaneous scan procedures.

It is to be pointed out that although the present application emphasized the various physical modes of registration of magnetization, optical, and mechanical in describing the invention, other modes of registration such as electrical and chemical, as previously defined, can be used effectively in various combinations with the magnetization, optical, and mechanical registrations. In addition, the data type can be digital, analog, alphabetical, and numerical, all as previously set forth in the definition of data type.

The physical arrangement of the modes of registration include one of various spatial orderings of data, such as adjacent, opposite, surrounding, superposition or overlaid, line in, areawise, punched through obverse, or reverse, all in various combinations, if desired.

Finally, the data can be arranged in categories, including factual data, instruction data (flow, control, operation, programming or processing of factual data), and organizational information data which tells about locating or classifying factual or instructional data, on the card record 20, with the factual data being used in conjunction with either the instruction data or organizational information data, or with both the instructional data as well as the organizational information data.

If among the ordinary array of holes on a card, a second array (e.g. printed spots) is interposed, the information stored is doubled. But if the top half of the card (holes plus spots) is made to convey one code or language, and the bottom half another, with body-color describing this, each half carries new kinds (i.e. more) of information. These might be, respectively, data and instructions, or two classes of data. In addition, the information capacity in each unit square (20) is made greater then the sum, by using the holes and spots in combination.

In general the use of modalities in combination increases the bit capacity over the same data independently. In addition, the use of areas in combinatorial relation to each other increases the capacity for information which runs in categories, whereby some data controls other. The combined use of analog registration further increases the bit capacity.

Another important advantage of the coded card is the increased efficiency for storing instrinsically classified information. Medical examinations present data in highly organized form. History, physical examination, physiologic responses, laboratory findings, psychiatric examinations, neurologic examination, and so forth are systematic and distinct. Clinical findings, interpretive data and therapeutic records are separately organized. Such well classified data should be kept segregated for storage. This requires several variables having assorted ranges, including time. A card, as in the present invention, with many modalities (e.g. punches, magnetic, color) and submodes (e.g. red, green, blue), intrinsically fits this need to segregate data into classes and subclasses, and so would expedite coding, storage, retrieval and processing this kind of information.

In general, biological data and its processing involve high internal organization, which is obscured by digitalization into a single mode. In addition, final stages of data retrieval can be done faster visually than by computer. A coding system using many modalities which are seen at a glance, is specially adapted to flexibility, accuracy and speed in handling biological data.

Another important advantage of the coded card of this invention resides in the use of redundancy to eliminate error in recording data and reading the data. For example, the "flexowriter" tape uses five columns in the maximum number of combinations, i.e. minimum redundancy. The Air Force eight (8) column tapes adds redundancy to reduce error; each character must have at least two (2) holes. The IBM card 10 to 12 columns, requiring not over three (3) holes per character; this further reduces error, though at the cost of compactness.

If now one introduces new modalities, and codes the increased information in particular ways (e.g. certain classes in certain modalities) one restores compactness, but retains the high redundancy needed to exclude error.

In general, to minimize error, the checking time needed in complex computation and data storage becomes a large and costly item. If the system has high redundance—many combinations not permitted, or high organization of data required—then not only is checking speeded, but error is reduced.

Finally, the coded card of the present invention permits open codes and accepts uncodable data. For example, in fields like medicine (diagnostic, therapeutic and research) coding of data must be open and flexible. Certain observations (e.g. recurrent fever, blood findings) are uninterpretable till several are recorded. Slow variable (i.e. weight) must be observed sequentially. Secondly, other observations are only codable in part; previous records gain meaning or change interpretation with the advance of biomedical science. Some original raw data should even be recorded without coding or evaluation, with space for later coding in the same modality. Thus, electrocardiograms and sonograms are as yet only partly interpretable (codable), and question-answer material can change in interpretation as new data come in.

For "open" coding, a multi-modal heirarchic system has better capacity and access than a list of inventory in uniform single code. It makes possible the storage of conversations, photographs, sound and voltage (analog), record on the same card, with information which is scored and scaled in (digital) code. Interpretive data should be stored along with, but readily distinguishable from, descriptive data.

In general, for biological data (whether personnel, hospital, or satellite) a multimodal card offers storage of uncodable or partly codable data, as well as "open" coding, made efficient through a heirarchic classification evident to the eye.

Obviously, many other modifications and variations of the present invention are possible in light of the above teachings. It is, therefore, to be understood that within the scope of the appended claim the invention may be practiced otherwise than as specifically described.

What is claimed is:

A process for obtaining information from a data storage card having a plurality of modalities of data formed thereon in data related combinations, each combination consisting essentially of at least one aperture and at least one other modality of data registered on one side of said card in juxtaposition with said aperture on the portion of said card which is normally reserved for surrounding said aperture, which process comprises optically sensing said aperture by illuminating the opposite side of said card, diverting a portion of the resultant beam of light passing through said aperture to impinge upon said other modality of data, detecting the light which is reflected therefrom, and detecting the remaining portion of said resultant beam of light passing through said aperture.

References Cited by the Examiner

UNITED STATES PATENTS

| | | | |
|---|---|---|---|
| 2,448,830 | 9/1948 | Robbins et al. | 235—61.115 X |
| 2,704,634 | 3/1955 | Rauch | 235—61.12 X |
| 2,914,746 | 11/1959 | James | 340—149 |
| 2,953,300 | 9/1960 | O'Brian et al. | 235—61.12 |

DARYL W. COOK, *Primary Examiner.*

MAYNARD R. WILBUR, *Assistant Examiner.*